United States Patent [19]

Hill

[11] Patent Number: 4,533,110
[45] Date of Patent: Aug. 6, 1985

[54] RESILIENTLY SUSPENDED, TILTABLE AND TETHERED VEHICLE OPERATOR'S SEAT HAVING FORE AND AFT ADJUSTMENT

[75] Inventor: Kevin E. Hill, Milwaukee, Wis.

[73] Assignee: Milsco Manufacturing Company, Milwaukee, Wis.

[21] Appl. No.: 535,728

[22] Filed: Sep. 26, 1983

[51] Int. Cl.³ .............................................. B60N 1/02
[52] U.S. Cl. ................... 248/573; 248/393; 248/423; 297/347
[58] Field of Search ............ 248/573, 371, 393, 397, 248/398, 157, 419, 421, 423, 580, 581, 592, 658; 297/347, 353, 354, 355

[56] References Cited

U.S. PATENT DOCUMENTS

| | | | |
|---|---|---|---|
| 1,390,865 | 9/1921 | Bangle | 248/573 |
| 3,493,211 | 2/1970 | Barecki | 248/573 |
| 3,608,855 | 2/1969 | Osenberg | 248/419 |
| 3,861,637 | 1/1975 | DeLongchamp | 248/581 |
| 3,917,209 | 11/1975 | Adams | 248/421 |
| 3,957,304 | 5/1976 | Koutsky | 248/393 |
| 4,014,507 | 3/1977 | Swenson | 248/407 |
| 4,083,599 | 4/1978 | Gaffney | 248/393 |
| 4,092,009 | 5/1978 | Koutsky | 248/421 |
| 4,155,593 | 5/1979 | Swenson | 297/284 |
| 4,384,741 | 5/1983 | Flum | 297/304 |

FOREIGN PATENT DOCUMENTS

| | | | |
|---|---|---|---|
| 225049 | 5/1962 | Australia | 297/347 |
| 265040 | 9/1968 | Australia | 297/347 |
| 2602133 | 7/1977 | Fed. Rep. of Germany | 248/399 |
| 1807458 | 6/1979 | Fed. Rep. of Germany | 248/421 |
| 57-7724 | 1/1982 | Japan | 297/347 |

Primary Examiner—William H. Schultz
Assistant Examiner—Robert A. Olson
Attorney, Agent, or Firm—James E. Nilles

[57] ABSTRACT

A resiliently suspended, tiltable and tethered vehicle operator's seat assembly which includes a sub-frame slidably mounted on a pedestal, a seat support frame resiliently supporting an operator's seat, the seat support frame being pivotally mounted about a transverse horizontal axis to the slidable sub-frame to permit the seat support frame and its resiliently mounted seat to tilt as a unit about the transverse axis; and a tether belt is connected between the seat and the slidable sub-frame for limiting the tilting movement of the seat support frame, the seat and the resilient support regardless of the position of the slidable sub-frame relative to the pedestal.

1 Claim, 6 Drawing Figures

RESILIENTLY SUSPENDED, TILTABLE AND TETHERED VEHICLE OPERATOR'S SEAT HAVING FORE AND AFT ADJUSTMENT

BACKGROUND OF THE INVENTION

1. Field of Use

This invention relates generally to vehicle seats for earth-working machinery such as backhoes, and in particular to means for permitting tilting of the seat about a horizontal transverse axis.

2. Description of the Prior Art

Adjustable vehicle seats of the prior art include swivel seats, backward and forward shiftable seats, deformable seats which permit raising or lowering of the leading edge of the seat, and vertically adjustable seats. Examples of vehicle seats having the features described above may be found in commonly assigned U.S. Pat. No. 4,155,593 issued May 22, 1979, to Swenson, and U.S. Pat. No. 4,014,507 issued Mar. 29, 1977, to Swenson, and commonly assigned and co-pending U.S. patent application Ser. No. 384,035 to Uecker et al. A seat tilting device is also shown in U.S. Pat. No. 4,384,741 issued May 24, 1983.

Notwithstanding all of the prior art adjustment features, an occupant's safety, comfort and convenience are not completely provided for by such seats in certain circumstances, such as in the operation of a backhoe where the operator must have good vision into the excavation at the rear of the backhoe.

OBJECTS AND SUMMARY OF THE INVENTION

The present invention provides a vehicle seat assembly including an operator's seat and a resilient suspension assembly therefor which are secured to a fore and aft shiftable sub-frame, the seat and resilient suspension means together being tiltable about a horizontal transverse axis relative to the sub-frame to permit the operator to lean forwardly and view the work being performed; the sub-frame, seat and resilient suspension means all being shiftable together on a pedestal and in a fore and aft direction; a tether belt means is provided between the sub-frame and the seat so as to safely limit the extent of the tilt of the seat while at the same time permitting the seat to be resiliently suspended by the suspension means and regardless of the fore and aft adjustment of the assembly relative to the pedestal. With the present arrangement there is no need to adjust the tether belt each time the seat pedestal is moved in the fore and aft directions and the suspension means is fully effective regardless of the adjusted position of the seat.

Other objects and advantages of the invention will hereinafter appear.

DESCRIPTION OF A PREFERRED EMBODIMENT

Figure 1:
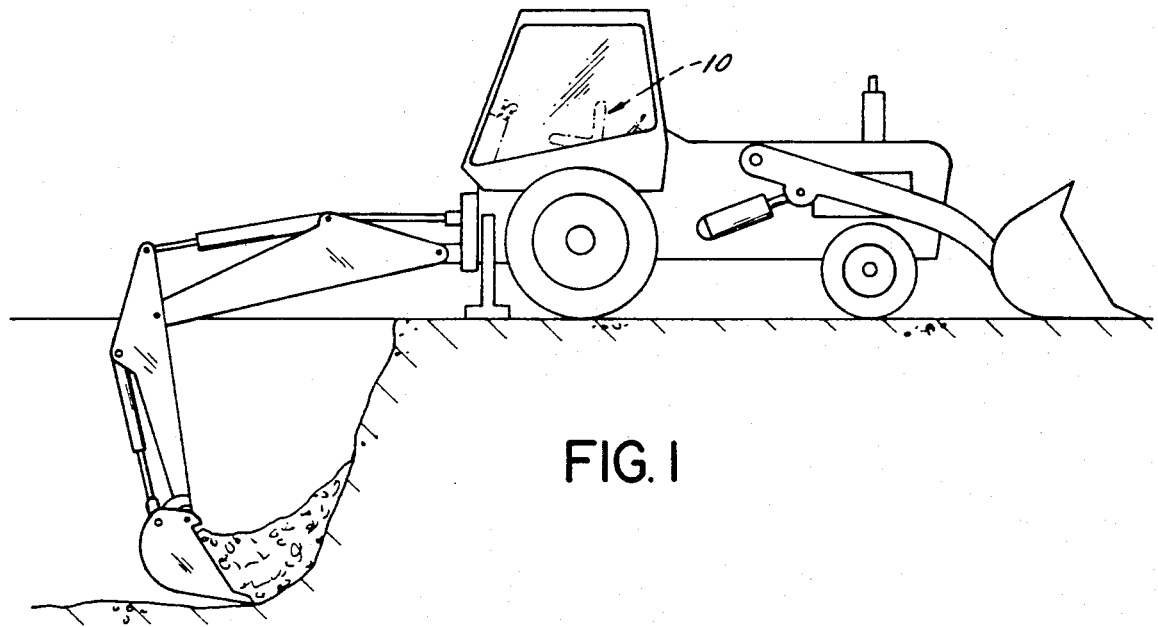
FIG. 1 is a side elevational view of a backhoe digging an excavation and where the invention finds particular utility.
Figure 2:
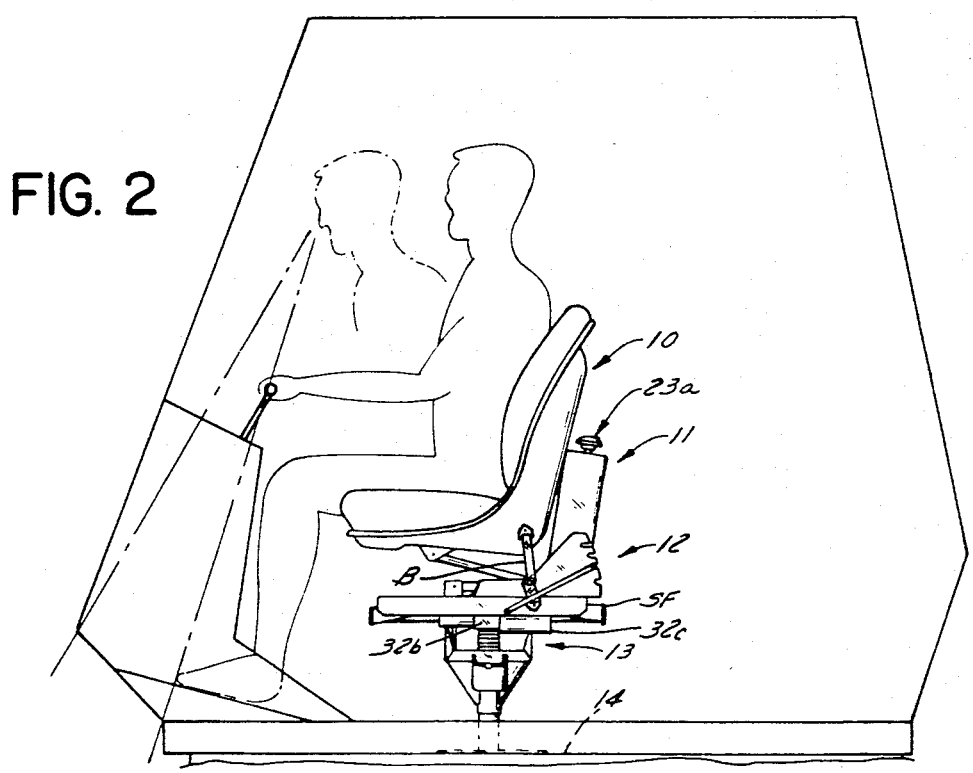
FIG. 2 is a schematic view of an operator in the backhoe and indicating his line of sight into the excavation.

The improved tethered seat finds particular utility when used in the environment shown in FIGS. 1 and 2. The improved apparatus includes a seat assembly 10, a suspension assembly 11, and a tilt lock assembly 12, all mounted on a pedestal support 13. The pedestal support 13 is secured to a platform or floor 14 of a vehicle seat such as an earth-working backhoe.

The seat assembly comprises a rigid sheet metal seat pan 15 formed to provide a backrest portion 16 and a seat portion 17 having conventional cushions.

Figure 4:
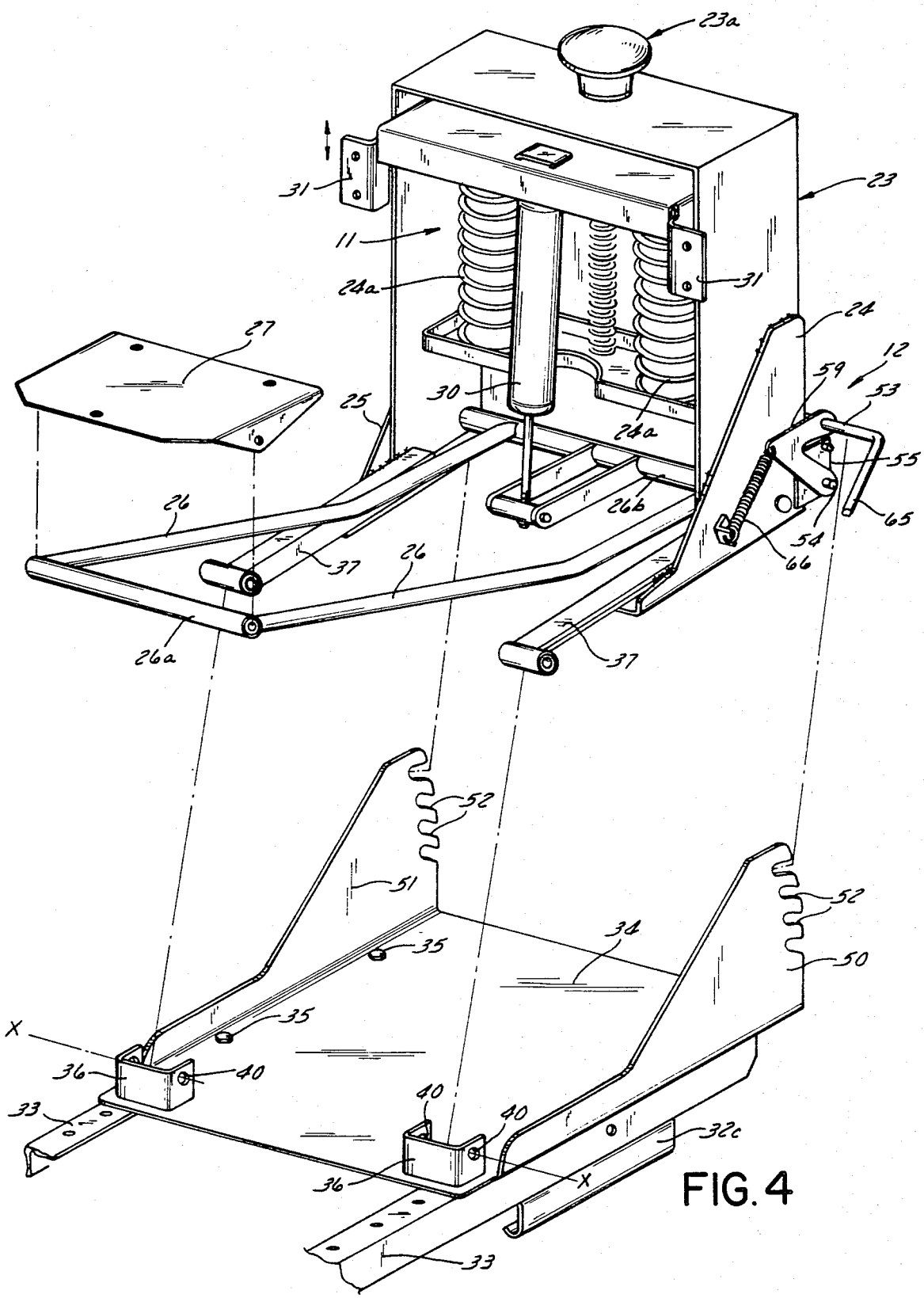
FIG. 4 is a fragmentary, exploded, perspective view of the pivotal, transverse mounting of the seat assembly and the resilient suspension shown in FIG. 1.

The seat assembly 10 is resiliently supported for vertical motion by means of the suspension assembly 11 which comprises a rigid support frame 23 having a pair of laterally spaced apart side plates 24 and 25 secured to the bottom of the support frame 23. The support frame 23 is positioned behind the backrest portion 16 of the seat assembly 10 and is also secured to the seat assembly 10 by means of a pair of tie rods 26 (FIG. 4). The tie rods 26 are rigidly secured together at their forward ends by a cross tube 26a. The rear ends of the rods 26 are rigidly connected together by a cross shaft 26b. Shaft 26b is supported on the stationary frame 23. The tube 26a is connected by pin 28 to bracket 27. Bracket 27 is secured to the center of the bottom of the seat portion 17 by bolts 29.

The support frame 23 houses suspension assembly 11 and a shock absorber 30, all of which is shown in the said U.S. patent application Ser. No. 384,035. The seat assembly 10 is operably connected to the suspension apparatus by means of formed bracket 31 (FIG. 4) secured to the back of the backrest portion 16 of the seat pan 15 and secured to the suspension apparatus within the support frame 23. Screw adjustment means 23a are provided for adjusting the compression of the two springs 24a. The suspension apparatus permits vertical motion of the seat (relative to the support frame 23) which is dampened to absorb shocks and provide comfort for a seat occupant. Such a suspension assembly 11 is described more fully in commonly assigned and co-pending U.S. patent application Ser. No. 384,035.

Figure 5:
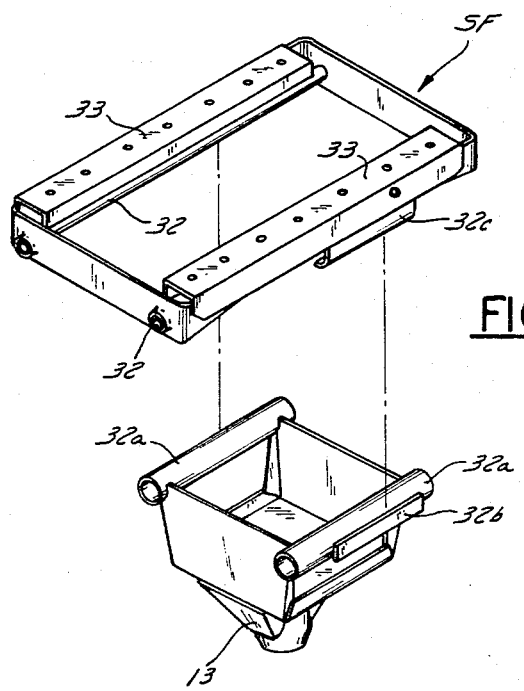
FIG. 5 is a perspective, exploded view of the pedestal support and the fore and aft slidable sub-frame.

The pedestal 13, secured to the floor 14, is a swivel pedestal such as is more fully described in commonly assigned U.S. Pat. No. 4,014,507. It is believed sufficient to say that the pedestal 13 includes a pair of laterally spaced apart guide tubes 32a (FIG. 5).

Figure 3:
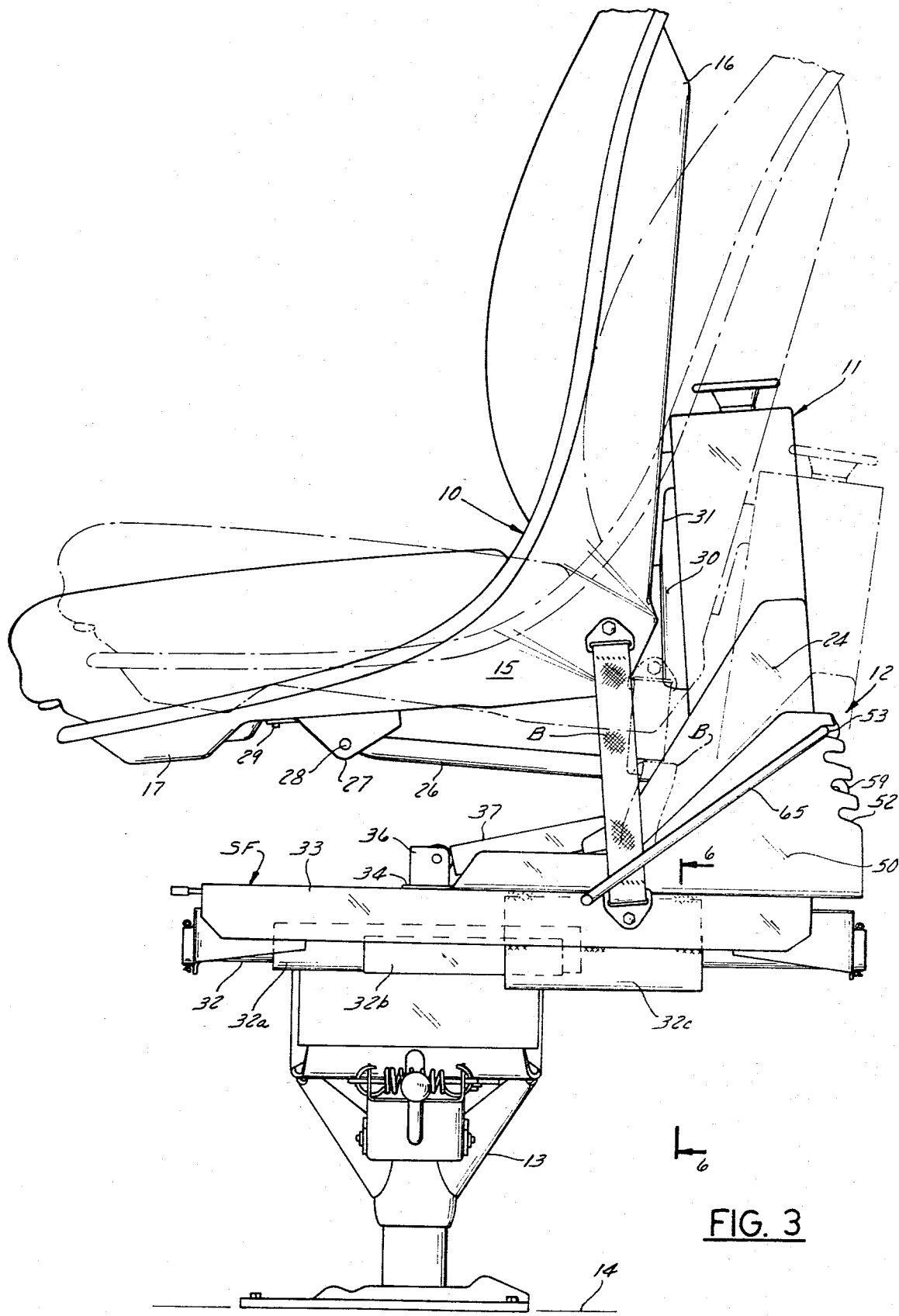
FIG. 3 is a side elevational view of a vehicle seat in accordance with the invention showing the seat in full lines in a tilted position.
Figure 6:
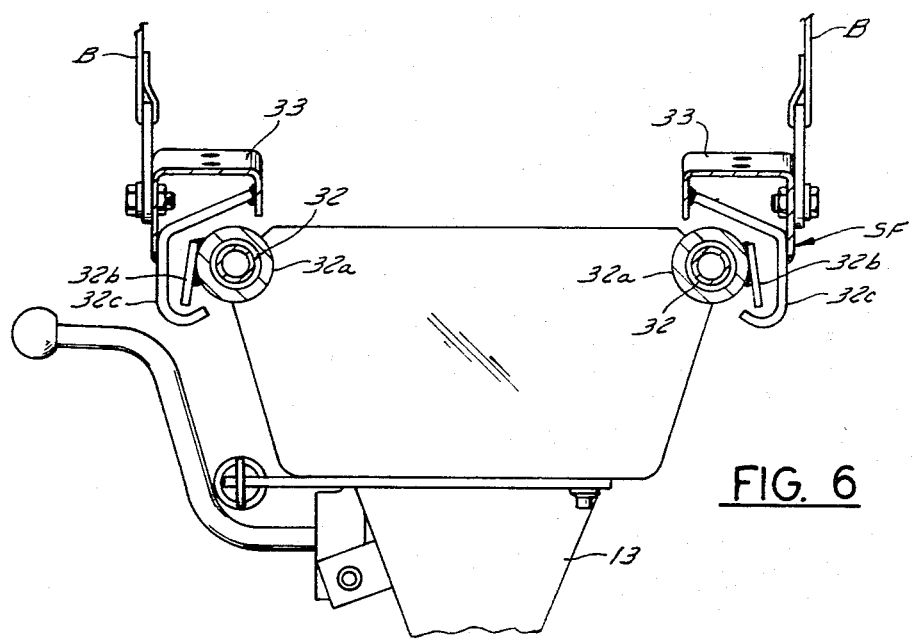
FIG. 6 is a vertical, transverse sectional view taken along line 6—6 in FIG. 3.

A slidable sub-frame SF includes a pair of laterally spaced apart top rails 33 which are fixed to tubes 32 which in turn are slidably engaged in pedestal guide tubes 32a. Accordingly, the resilient suspension assembly 11 and, hence, the seat assembly 10 which is attached to the suspension assembly 11 may be moved rearward or forward by moving the slidable sub-frame SF on the pedestal guide tubes 32a. As shown in FIGS. 3 and 6, a tether belt B is provided on each side of the operator's seat and is connected at its lower end to the rails 33. When the seat is tilted as shown by the full lines in FIG. 3, the belt is fully stretched under tension to prevent further tilting of the seat. As shown in phantom lines in FIG. 3, when the seat is not tilted, the belts B are slack. Means are provided to act as a safety device when the belts are fully tensioned and to insure that further tilting of the seat does not occur. This means takes the form of a stop 32*b* (FIGS. 3 and 6) which is in the form of a steel, flat bar which is welded along the outer side of the guide tubes 32*a* on the pedestal. Cooperating with these stops are the safety hooks 32*c* which, as shown clearly in FIG. 6, are welded to the top rails 33. As shown in FIG. 6, the hooks are clear of the stops 32*b*, but when operative, the hooks 32*c* would be pulled upwardly due to the tilting action of the seat and engage the lower edges of the stops 32*b*.

The suspension assembly 11 is secured to the top rails 33 in a manner which will now be described. The sub-frame SF includes a rigid metal support plate 34 (FIG. 4) extending between and secured to the top rails 33. The support plate 34 is suitably secured, such as by bolts 35, to the top rails 33 to permit the support plate 34 to ride with the top rails 33 and slide tubes 32 as it slides in the guide tubes 32*a*. The resilient seat support frame 23 of the resilient suspension assembly 11 is pivotally secured to the support plate 34 by a pair of laterally spaced mounting brackets 36 (FIGS. 3 and 4) and rigid support braces 37 pivoted thereto.

The mounting brackets 36 are welded to the support plate 34 and have axially aligned holes 40 which define the transverse pivotal axis X—X. The pivotal axis X—X is beneath the center of gravity of an occupied seat and suspension assembly. This pivot axis permits the seat unit to tilt by the operator's weight shift and the operator's height does not significantly change.

The support braces 37 are welded to the side plates 24 and 25, respectively, of the support frame 23. The support braces 37 extend from the side plates toward the mounting bracket 36 and terminate at their free ends where they are pivoted to the brackets as mentioned. With the support brace 37 pivotally connected to the support plate 34 and rigidly connected (as by welding) to the support frame 23 of the suspension assembly 11, the suspension assembly 11 and the attached seat assembly 10 may be pivoted about axis X—X to permit the seat assembly to be variably tilted relative to the support plate 34.

TILT LOCK ASSEMBLY

The tilt lock assembly 12 is fully shown and described in the commonly assigned U.S. patent application Ser. No. 523,783 filed Aug. 17, 1983. It is therefore believed sufficient to say for purposes of this disclosure that the assembly 12 is provided to releasably lock the seat and suspension assemblies in a plurality of tilted positions. The lock assembly 12 includes a U-shaped, stationary lock member comprising the support plate 34 and a pair of parallel laterally spaced apart side plates 50 and 51. As is more fully shown in FIG. 4, the side plates 50 and 51 are integrally formed with the support plate 34 and are spaced apart a distance sufficient to receive the support frame 23 of the suspension assembly and to permit unobstructed movement of the suspension assembly 11 as it rotates about pivotal axis X—X.

The trailing or rear edges of side plates 50 and 51 are arcuate to define a plurality of notches 52 along their rear edge. The notches 52 of plate 50 are aligned with the notches 52 of plate 51.

The tilt lock assembly 12 also includes a movable lock bar 53 pivotally connected to the support frame 23, and is adapted to releasably engage the stationary lock member. To pivotally secure the lock bar 53 to the support frame 23, a hinge bar 54 (FIG. 4) is secured to the support frame 23 by mounting brackets 55 which receive hinge bar 54. The axis of the hinge bar 54 is parallel to the pivotal axis X—X. Thus, the lock bar 53 is spaced from and swingably connected to the hinge bar 54 by means of the hinge plates 59. The bell-crank shaped hinge plates 59 are welded to the lock bar 53. The hinge plates 59 are sized such that the lock bar 53 is retained parallel to the pivotal axis X—X. The lock bar 53 is of axial dimension sufficient to extend past the side plates 50 and 51 of the stationary lock member and sized to be selectively received within aligned notches 52.

A handle 65 is provided on one outer end of the lock bar 53 and extends along the exterior of the left side plate 50 of the stationary lock member. A pair of springs 66 are provided on the left and right side plates of the suspension assembly support frame and are connected between the side plates and the hinge plates to bias the latter to the locking position of the bar 53.

By operation of the tilt lock assembly 12, a seat occupant may selectively vary the tilt position of the seat assembly 10.

With the above-described structure, the entire tilt adjust apparatus, together with the suspension assembly 11, can be tilted about axis X—X and the suspension assembly remains operative in any tilted position of the seat assembly. The desired degree of tilt of the seat can be easily obtained by a slight shifting of the operator's weight. The pivot point is directly under the center of gravity of the combined weight of the suspension assembly and the operator. This results in no appreciable change in height of the operator.

With the present invention, the entire seat assembly including the seat and its resilient suspension means can be tilted about a transverse, horizontal axis and tether belt means are provided for limiting the tilting of the assembly regardless of the position of the slidable sub-frame upon which the seat and resilient means are mounted. Thus, the resilient means is fully effective to resiliently support the seat regardless of its position. Safety means are also provided between the sub-frame and the pedestal so as to prevent excessive tipping when the tethered belts are fully tensioned.

I claim:

1. A resiliently suspended, tiltable and tethered vehicle operator's seat assembly for an earth-working vehicle such as a backhoe wherein an earth-working bucket or the like is operative to form an excavation in the ground and at the rear end of the vehicle and the operator is positioned on a vehicle seat located adjacent said rear end of said vehicle whereby the operator must visually observe the excavation being done, said seat assembly comprising: a seat assembly supporting pedestal secured to said vehicle adjacent one end thereof, said pedestal having a pair of laterally spaced seat assembly guide tubes, a slidable sub-frame slidably mounted on said guide tubes, a seat support frame supporting an operator's seat and also supporting resilient means for supporting said seat on said seat support frame, pivot means for pivotally connecting said support frame about a transverse horizontal axis to said sub-frame to permit said seat support frame, said seat and said resilient support means to tilt as a unit about said axis; and tether belt means connected between said seat and said slidable sub-frame for limiting the tilting movement of said seat support frame, said seat and said resilient means regardless of the position of the slidable subframe relative to said pedestal, safety stop means located between said pedestal and said slidable sub-frame to limit relative movement therebetween when said tether belt means is tensioned excessively, said safety stop means including flat steel bar stops welded along the side of said guide tubes, and also includes upwardly facing hooks welded to said slidable sub-frame, said hooks engaging said bar stops when said tether belt means is tensioned excessively.

* * * * *